J. MAGNUS.
ADDING AND RECORDING MACHINE.
APPLICATION FILED JULY 12, 1909.
1,137,508.
Patented Apr. 27, 1915.
3 SHEETS—SHEET 2.
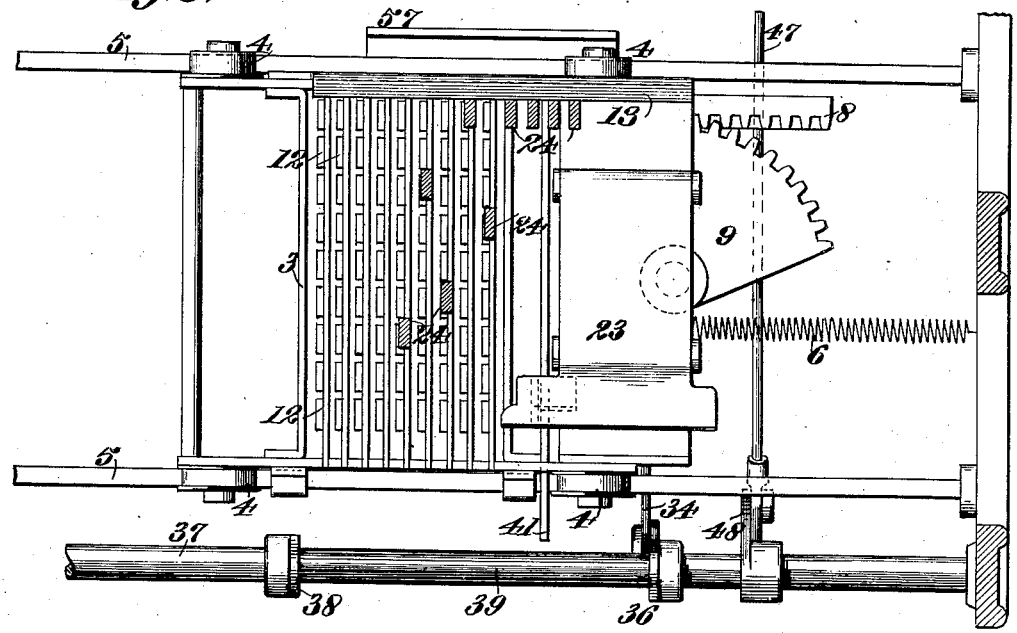
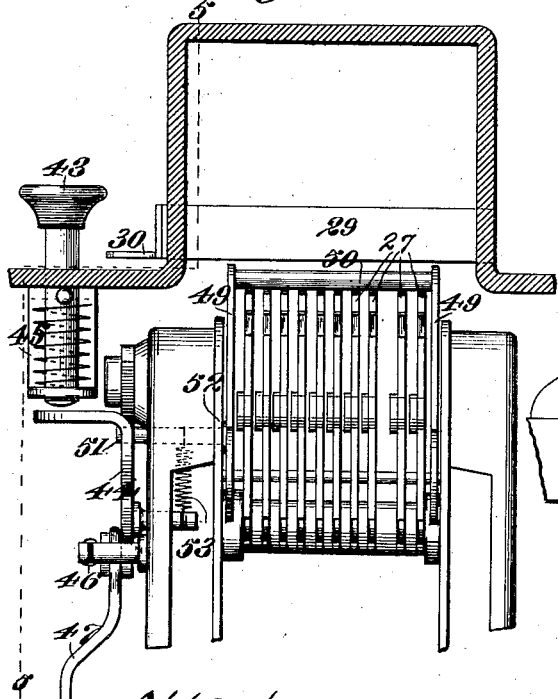
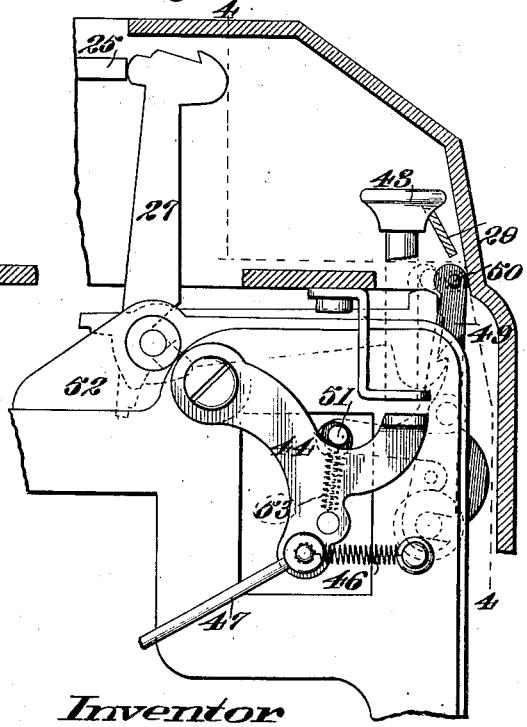
Inventor
John Magnus
By J. D. Rippey,
atty

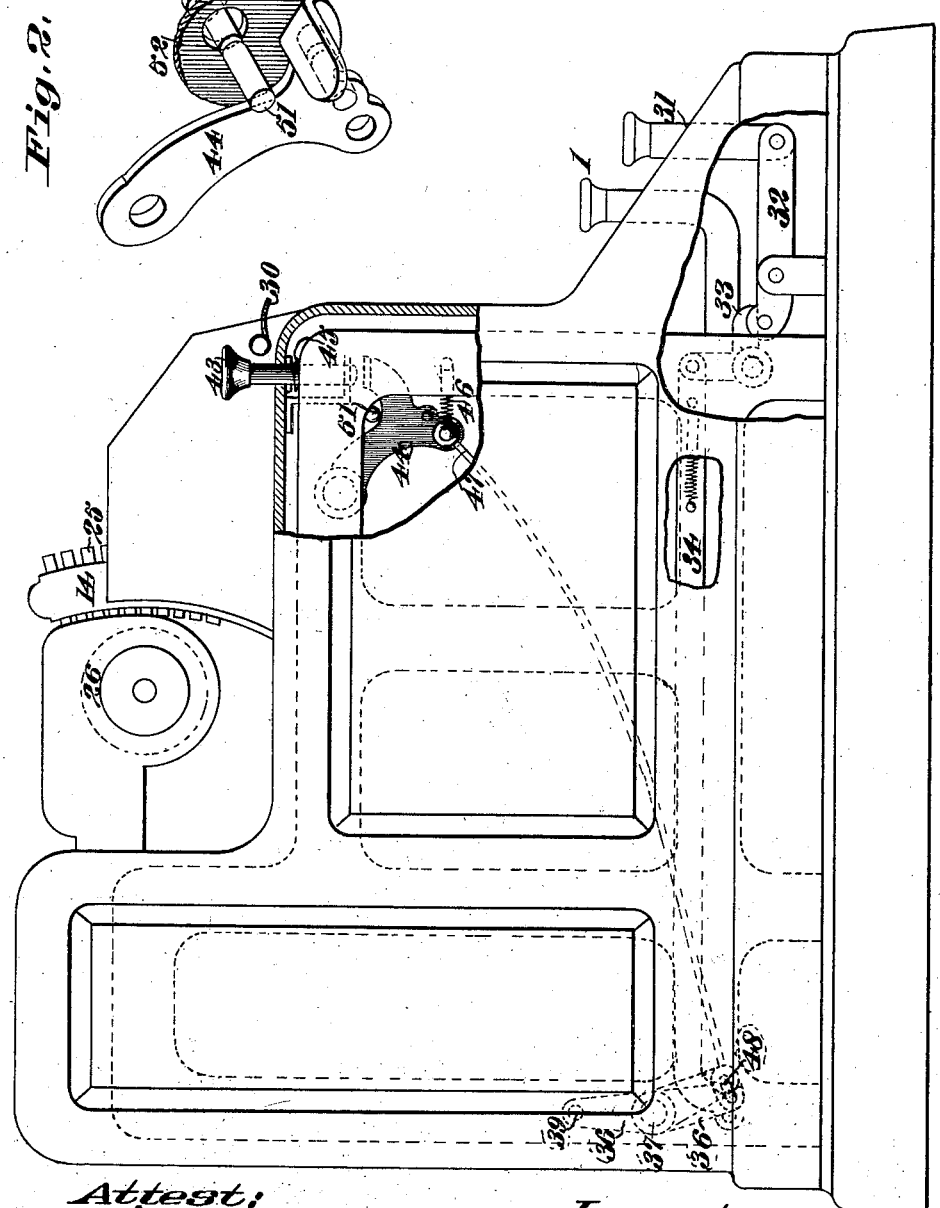

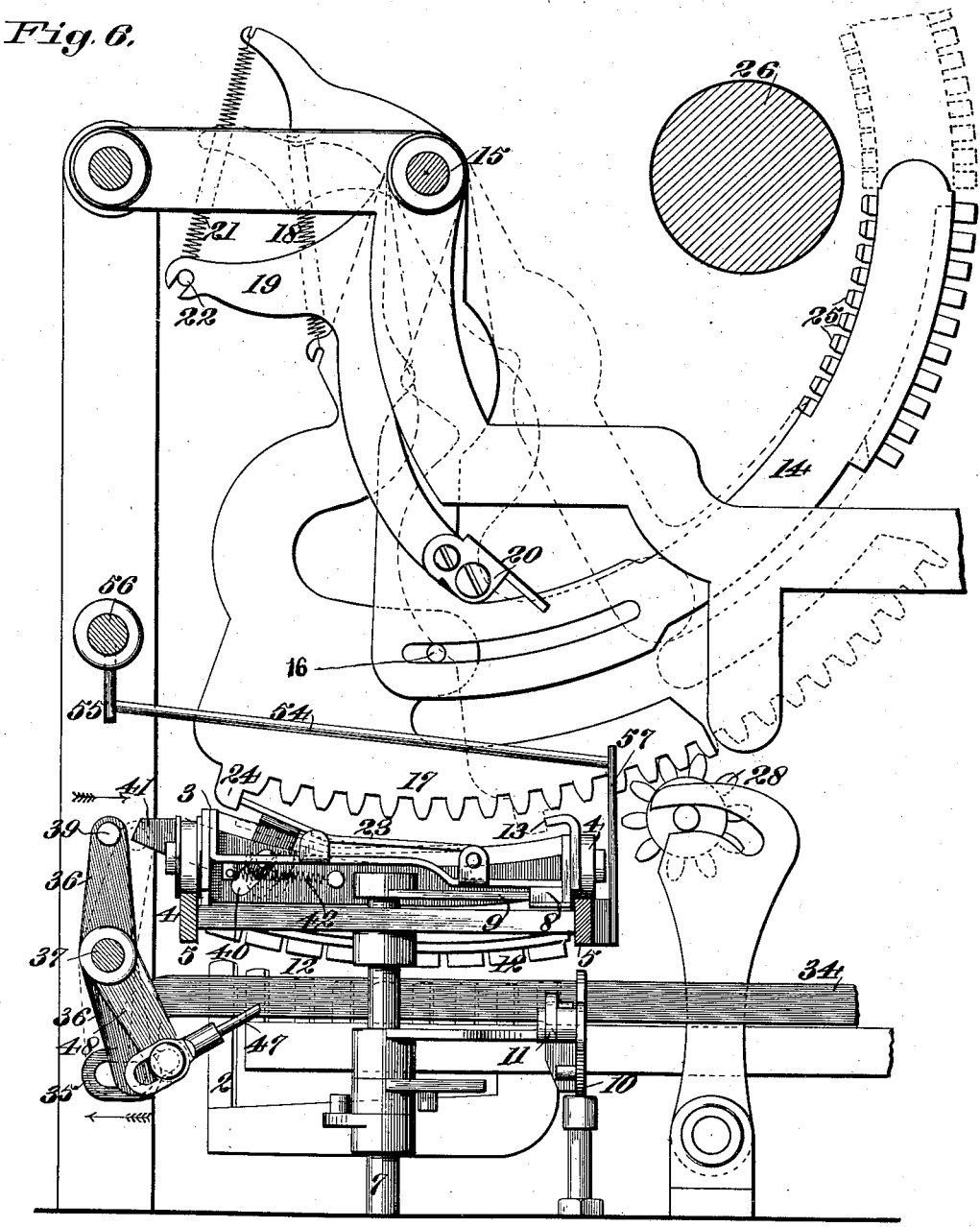

UNITED STATES PATENT OFFICE.

JOHN MAGNUS, OF POPLAR BLUFF, MISSOURI, ASSIGNOR, BY MESNE ASSIGNMENTS, TO THE DALTON ADDING MACHINE COMPANY, OF CINCINNATI, OHIO, A CORPORATION OF OHIO.

ADDING AND RECORDING MACHINE.

1,137,508.     Specification of Letters Patent.     Patented Apr. 27, 1915.

Application filed July 12, 1909. Serial No. 507,273.

*To all whom it may concern:*

Be it known that I, JOHN MAGNUS, a citizen of the United States, residing at Poplar Bluff, Missouri, have invented a new and useful Adding and Recording Machine, of which the following is a specification.

This invention relates to adding and recording machines, and it has for its object to provide mechanism whereby one of two numbers successively struck on the keys of the machine may be subtracted from the other, and automatic means to prevent recording of the subtrahend when the machine is so operated.

Another object is to provide a machine comprising numeral keys and mechanism operable to add and record numbers struck on the keys, in combination with subtracting mechanism for operating said adding mechanism effectively to produce and represent a number which is the remainder or difference between the number or total represented in said adding mechanism and another number subsequently struck on the keys, and means controlled by said adding mechanism to prevent said second number from being recorded when the machine is operated.

Another object is to provide mechanism in an adding and recording machine whereby, after the minuend has been recorded, the complementary 9's of the subtrahend may be automatically introduced into the machine without the necessity of being preliminarily struck on the keyboard and whereby the machine may be operated to determine the difference between the subtrahend and minuend without producing records of the subtrahend.

Another object is to provide in combination with an adding and recording machine comprising a series of type carriers operable to record numbers, and detaining devices adjustable to prevent operation of said type carriers to record numbers, adding mechanism operable to add the numbers recorded, and a totals recording key having connections for releasing said detaining device to permit said type carriers to move to record totals, in combination with subtracting mechanism operable in connection with a part of said totals recording key connections to release said detaining device to permit said type carriers to introduce into said adding mechanism the complementary 9's of subtrahend numbers without preliminarily introducing said 9's into the machine through the usual key devices.

With these and other objects in view, I have illustrated my invention embodied in a well known machine of the cross carriage type, of which—

Figure 1 is a side elevation with a part of the case of the machine removed to illustrate the connections of the subtracting key and the totals recording key. Fig. 2 is a perspective view of a lever operated by the subtracting key and a part of the non-printing device actuated thereby. Fig. 3 is a plan view of the cross carriage showing the detaining plate carried thereby and the connections from the totals recording key and the subtracting key for releasing said detaining plate. Fig. 4 is a front elevation of the printing hammer section showing the subtracting key and the devices operated thereby to interrupt operation of the printing hammers. Fig. 5 is a sectional view showing said devices in side elevation. Fig. 6 is a sectional view of the rear of the machine showing the connection from the subtracting key and totals recording key to the mechanism for releasing the detaining device. Figs. 7 and 8 illustrate specimens or examples of work in subtraction.

The type of machine with which I have illustrated the subject-matter of the present invention is what is known as a cross carriage machine, and is more or less extensively known commercially. Some of the more prominent features of this machine are the subject-matter of Hopkins Patent No. 1,039,130, dated September 24, 1912, the application for which was filed January 24, 1903, Serial No. 140,390, and of his British Patent No. 854 of 1904. Said machine as at present manufactured, and as described in said patent, includes a keyboard comprising ten numeral keys 1 whose levers extend rearwardly and are provided on their rear ends with vertical extensions 2 (Fig. 6). A carriage 3 has anti-friction devices 4 whereby it is supported upon rails 5 extending transversely above the rear ends of the key-levers and is actuated in one direction by a spring 6. Said carriage is entrained with an escapement shaft 7 by means of a rack 8 and gear segment 9, the latter being rigidly attached to one end of the shaft. An escapement bar 10 extends across the rear portions of the key-levers and controls leftward movement of said carriage through an escapement device 11 connecting said escapement bar with the escapement shaft. Successive operations of the keys cause the carriage to be moved step by step across the machine from right to left with respect to the operator facing the machine. Within the carriage is a series of rows of pins 12 which are adjustable by the keys to represent numbers. The pin in each row at the rear represents the character "0", the next represents "1", and so on to the foremost pins in said rows which represent "8". For the digit "9" a plate 13 extends along the front side of the carriage in front of all the rows of pins and for a considerable distance leftwardly beyond said rows as shown in Fig. 3. Numbers are set up in the carriage by striking the keys representing the digits of the numbers and said keys move the pins 12 to proper position to represent the various digits. For the digit "9" no pins are moved, but the carriage is moved one step or space each time the "9" key is operated, the plate 13 always being in position to represent "9" in advance of all the rows of pins. In said machines a series of type carriers 14 swing from the shaft 15 (Fig. 6) and have pin-and-slot connection 16 with a series of racks 17 also swinging from said shaft 15. The type carriers and racks are oppositely actuated by springs 18 connecting rearward extensions of type carriers above the shaft 15 with the rear portions of the racks. Two arms 19 are on the shaft 15, one at each side of the group of type carriers and racks, said arms having a bar 20 supported transversely in front of the vertical extensions of the type carriers whereby said type carriers are moved rearwardly after operation and are normally held in their idle positions. Springs 21 connect the extensions on the type carriers aforesaid with a rod 22 held by the arms 19, and are effective to actuate the type carriers forwardly whenever the arms 19 are swung forwardly to release the type carriers from restraint by the bar 20.

The carriage 3 supports a pivoted detaining plate 23 which in idle position of the parts projects in front of heels 25 on the tracks (Figs. 3 and 6). This will prevent movement of the racks beyond their idle positions should the arms 19 be swung forwardly, except when said detaining plate is carried leftwardly to release the racks or is depressed below the heels 24. As numbers are set up in the carriage by operation of the keys as above described, the plate 23 is moved leftwardly, leaving one rack free for operation for each digit in the number set up. After the number has been set up in the carriage, the arms 19 are swung forwardly by suitable well known connections (not shown), and as many racks and type carriers as there are digits in the number also move forwardly until the heels 24 on the racks so moving engage against the pins 12 or plate 13 representing the number. This engagement of the racks with said pins and plate stops movement of the top carriers and alines the proper type 25 on said type carriers adjacent to the platen or paper carriage 26. After the type carriers stop in such position the type 25 so alined are driven to record by operation of the printing hammers 27 arranged to strike said type with sufficient force to produce impressions on paper supported against the platen. Those racks and type carriers whose operation is not necessary to record the number to be recorded are detained from forward movement by the heels 24 on said racks engaging the rear edge of the plate 23. The type carriers are then returned to idle position by moving the bar 20 rearwardly, said bar engaging said type carriers as shown in Fig. 6.

Adding mechanism 28 is arranged for automatic operation by the racks 17 to add the numbers recorded. Means is provided to interrupt operation of the printing hammers to permit numbers thus to be added without producing record thereof, said means comprising a plate 29 having a key or lever 30 on one end whereby it may be moved into the path of movement of the printing hammers and thereby prevent said hammers from striking the type. The adding mechanism is of course provided with suitable transferring or carrying devices, but said devices are not herein illustrated for the reason that they do not constitute any part of the subject matter of the present invention. After any number has been set up in the carriage and recorded or added, said carriage (except in instances of repeating) is automatically moved to its idle position at the right with respect to the operator facing the machine, thereby carrying the detaining plate 23 in front of the heels 24 on all the racks. This carriage-return does not constitute part of the subject-matter of the present invention, and therefore is not illustrated in the drawings.

After any number or total has been registered or represented in the adding mechanism, said number or total may be recorded and said mechanism cleared. The means for accomplishing such results includes a totals-recording key 31 arranged in convenient position in the keyboard and having its lower end pivoted to the front end of the lever 32 (Fig. 1). The rear end of said lever 32 has a pin projecting under the front end of a bell crank lever 33, the opposite end of said bell crank having a link 34 extending rearwardly and connected by pin-and-slot connection 35 with an arm 36 attached to a rock shaft 37 (Fig. 6). Said arm 36 projects above the shaft 37 and assisted by a similar arm 38 supports a rod 39 extending for considerable distance parallel with the rear side of the carriage 3. The detaining plate 23 has a pin extending through an oblique slot 40 in a plate 41 slidably mounted in the carriage and actuated rearwardly by a spring 42, thereby sustaining said plate 23 in its highest position. When the totals recording key is depressed the rod 39 is swung forwardly against the rear end of the sliding plate 41, pushing said plate forwardly in opposition to its spring 42 and drawing downwardly the plate 23 below the heels 24 of the racks. This releases all of the racks from restraint by said detaining plate and permits them to travel forwardly with the type carriers to register and record any total or number contained in the adding mechanism when the arms 19 are swung forwardly. It will be understood, of course, that during such operation the adding mechanism is held entrained with the racks during the forward movement of the latter, but the means for accomplishing this result is well known and constitutes no part of the present invention.

In performing examples of subtraction by a machine constructed as above, the number or series of numbers whose totals are to constitutes the minuend are first introduced into the adding mechanism, after which as many 9's as are necessary in connection with the subtrahend number to extend entirely across the adding mechanism, are struck on the keyboard and then the true complement of the subtrahend is set up in the carriage. This requires care in striking the correct number of 9's into the machine and requires that one key be struck for each order up to the full capacity of the machine. My invention dispenses with the necessity of striking the complementary 9's in higher orders from the true complement of the number, and provides means for automatically selecting and introducing into the adding mechanism the correct number of 9's to complete the subtrahend complement up to the full capacity of the machine without the necessity of striking said 9's on the keys. The mechanism for accomplishing this function includes a subtraction key 43 (Figs. 1, 4 and 5) operating through an opening in the case of the machine and having its lower end resting upon a lateral extension on the lever 44 pivoted to the frame of the machine adjacent to the printing hammer section. A spring 45 encircles the stem of the key 43 and operates to sustain said key in its raised position. A spring 46 connected to the lever 44 and to the machine frame supports said lever in its upper position. A link 47 extends from the lever 44 obliquely downwardly and rearwardly and has pin-and-slot connection with an arm 48 attached to the rock shaft 37. (Dotted lines, Fig. 1; Fig. 6). Through this connection the key 43 is operable to rock the shaft 37 effectively to operate the sliding plate 41 to lower the detaining plate 23 as above described.

From the foregoing it will be clear that when any number is set up in the carriage less than the capacity of the machine, a 9 may be printed and added in each order above said number by operating the key 43 to lower the plate 23 and then operating the racks and type carriers. In each instance all the racks in higher orders from the number represented in the carriage will move forwardly until stopped by the plate 13 which represents "9" in all orders. Return movement of the racks introduces said 9's into the adding mechanism. In performing examples of subtraction on machines of this character, the complement of the subtrahend number is added to the minuend and the result is the difference between the subtrahend and the minuend. For further explanation, it may be seen in Fig. 7 that the number "A" is the minuend from which the number "B" is to be subtracted, and the number "C" represents the complement of the number "B" up to the full capacity of the machine. By my present invention the actual number complementary to number "B" is set up in the carriage, after which the plate 23 is lowered by operation of the subtracting key 43 when all the type carriers and racks are operated forwardly to introduce the full complement as shown at "C" into the adding mechanism. In these examples of subtraction it is desirable that no record of the number "C" be produced, since a record of such number would simply lead to confusion. To prevent recording of this number when it is introduced into the adding mechanism, I provide devices cooperating with the subtracting key effectively to interrupt operation of the printing hammers and thereby prevent them from striking the type.

Within the hammer section are pivoted two arms 49 to the upper ends of which a bar or rod 50 is connected (Figs. 2, 4 and 5). One of said arms 49 has a pin 51 projecting through the plate 52 constituting one of the said arms of the hammer section and extending above the lever 44. A spring 53 connects said projection 51 with a lever 44 whereby said lever 44 when actuated downwardly by the subtracting key 43 will operate the arms 49 effectively to carry the bar 50 over the front ends of the printing hammers to prevent the latter from being thrown against the type. In idle position of the lever 44 the arms 49 are held in their forward position in which the bar 50 will not interfere with the operation of the hammers. An example of work performed by this mechanism is shown in Fig. 8, in which the minuend number "A" is recorded and introduced into the adding mechanism, the subtrahend number indicated by "E" is recorded but not added, and the subtrahend complement (not shown) is added but not recorded, and the result produced in the adding mechanism is the number "D" which is the difference between the numbers "E" and "A".

For guiding the racks in their operations I provide a series of rods 54 extending between the racks and having their rear ends supported by projections 55 from the cross shaft 56, and their front ends supported by a comb-plate 57 the teeth of which extend between the racks and the lower end of which is connected to one of the carriage rails 5. Said rods prevent lateral vibration of the racks and guide them properly to engage their respective pins 12 when numbers are set up in the carriage, and hold them in mesh with the wheels of the adding mechanism.

I am aware that there may be modifications and alterations in the construction and arrangement of the parts embodying this invention without departure from the spirit and scope of the invention, and I do not restrict myself to identical features of construction or arrangement, but

What I claim and desire to secure by Letters Patent is—

1. In an adding machine, the combination with a series of racks, a carriage whose operation is necessary before said racks may be operated, a detaining device arranged to prevent operation of said racks under certain conditions, a totals recording key, and connections operable by said totals recording key to release said detaining device, of a subtracting key operable to move said connections to release said detaining device for subtracting operations, substantially as described.

2. In an adding machine, a movable carriage, means for setting up numbers in said carriage, a series of racks, a detaining device supported by said carriage to prevent operation of said racks under certain conditions, a member adjacent to said detaining device operable to move the same, a totals recording key operable to move said member and detaining device, and a subtracting key operable to move said member and detaining device, substantially as described.

3. In an adding machine, the combination with a series of type-carriers, hammers arranged to drive the type on said type-carriers to record, and a element normally in position to prevent movement of said type-carriers to position to coöperate with said hammers, of connections for moving and holding said element in position to release said type-carriers, a bar normally held out of the path of movement of said hammers by said connections, and means for moving said bar in the path of movement of said hammers to prevent said hammers from striking the type on said type-carriers when said connections are in position to release said element.

4. In an adding machine, a movable carriage, means for setting up numbers in said carriage, recording mechanism operable to record said numbers, adding mechanism, a detaining device preventing operation of said recording mechanism when said carriage is void of numbers, a connection for moving said detaining device, a totals recording key arranged to operate said connection, and a subtracting key arranged to operate said connection, substantially as described.

5. In an adding machine, a movable carriage, means for setting up numbers in said carriage, mechanism for recording said numbers, adding mechanism, means for operating said adding mechanism to add numbers different from the numbers set up in the carriage, and automatic means for preventing said recording mechanism from recording said numbers, substantially as described.

6. In an adding machine, a movable carriage, adding mechanism, racks for operating said adding mechanism, a detaining device in said carriage to prevent operation of said racks under certain conditions, an element for moving said detaining device, a number of keys each of which is operable to move said element effectively to release said detaining device from said racks, substantially as described.

7. In an adding machine, a carriage, means for setting up numbers in said carriage, mechanism operable to add the numbers set up in said carriage, automatic mechanism operable to record the numbers added, means for causing said adding mechanism to add numbers different from those set up in the carriage, and automatic means for preventing said recording mechanism from recording the numbers added other than those set up in the carriage, substantially as described.

8. In an adding machine, the combination with a series of type-carriers, a detaining element for holding said type-carriers, means for moving said detaining element in one direction to release a selected number of said type-carriers successively, of means for moving said element in another direction, while said element is in the position to which it was moved as aforesaid, to release the remaining type-carriers.

9. In an adding machine, the combination with printing type, and hammers arranged to drive said type to print, of a rod movable in the path of movement of said hammers to prevent said hammers from striking said type, a lever, a spring actuating said lever to hold said rod out of the path of movement of said hammers, means for actuating said lever, and a spring acting to move said rod into the path of movement of said hammers when said lever is actuated as aforesaid, substantially as described.

10. In an adding machine, a series of racks, a detaining device holding said racks under certain conditions, a carriage supporting said detaining device, a totals recording key operable to release said detaining device independently of operation of said carriage to permit all of said racks to operate, and a subtracting key operable to release said detaining device to permit all of said racks to operate, substantially as described.

11. In an adding machine, a series of racks, a detaining device arranged to hold said racks from operating under certain conditions, a carriage for moving said detaining device, a member for moving said detaining device while said carriage is stationary, a totals recording key for operating said member, and a subtracting key operable to move said member, substantially as described.

12. In an adding machine, type-carriers operable in recording operations, hammers arranged to drive the type on said type-carriers to record, a detaining device for said type-carriers, a carriage for moving said detaining device to release selected numbers of said type-carriers, manipulative means for moving said detaining device to release additional numbers of said type-carriers, after a number of said type-carriers have been released by movement of said carriage, and a device controlled by said manipulative means to prevent said hammers from operating in a recording operation, substantially as described.

13. In an adding machine, racks operable to perform adding operations, a carriage, a detaining device for said racks, said detaining device being controlled by said carriage, and manipulative means for releasing said detaining device to permit said racks to operate for adding operations in any position of said carriage, substantially as specified.

14. In an adding machine, type-carriers operable to record, a carriage, a detaining device for said type-carriers, said detaining device being controlled by said carriage, a total key operable to release said detaining device, and manipulative devices operable to release said detaining device to permit said type-carriers to operate in any position of said carriage, substantially as specified.

15. In an adding machine, a carriage, type-carriers, mechanism for actuating said type-carriers, a device for preventing movement of said type-carriers, mechanism for moving said carriage and said device effectively to permit said type-carriers to be actuated, a total key for releasing said device and a connection for releasing said device when said carriage is away from its normal position, substantially as specified.

16. In an adding machine, a carriage, adding mechanism, racks for operating said adding mechanism to add, the possibility of operation of said racks for adding purposes being determined by the position of said carriage, and mechanism for rendering said racks operative for adding purposes independently of action of said carriage, substantially as specified.

17. The combination with adding and clearing mechanisms, and a series of type-carriers for actuating said adding mechanism in adding and clearing operations, of an element for preventing operation of said type-carriers, means for moving said element in one direction to release selected members of said type carriers for adding operations, manipulative connections for moving said element in another direction while said element is in the position to which it was moved as aforesaid, to release an additional number of said type-carriers for adding operations, and automatic means for restoring said element to position to prevent operation of said type-carriers.

18. In an adding machine, the combination with adding mechanism, type-carriers controlling said adding mechanism in adding operations, and hammers operable to drive the type on said type-carriers to record, of an element for preventing operation of said type-carriers, mechanism for moving said element in one direction to release selected numbers of said type-carriers in adding operations, optionally operable connections for moving said element in another direction while said element is in the position to which it was moved as aforesaid, to release an additional number of said type-carriers for adding operations, and means controlled by said connections for preventing said hammers from driving said type to record, substantially as described.

19. In an adding machine, type-carriers operable to record, a carriage, a detaining device for said type-carriers, said detaining device being controlled by said carriage, manipulative means operable to release said detaining device in any position of said carriage, and a totals recording key operable to release said detaining device in one position of said carriage.

20. In an adding machine, the combination with adding mechanism, printing type, and hammers for driving the printing type to print, of an element arranged to be interposed between said hammers and said printing type to prevent said hammers from striking said type, levers supporting said element, a movable member controlling said levers to hold said element away from said hammers, a key for actuating said movable member, and means for actuating said levers to interpose said element between said hammers and said type when said member is moved.

21. In an adding machine, in combination, multiple order adding mechanism, percussive digital type-impression mechanism, a key whose operation will enable all of said adding mechanism to be operated in adding operations, a movable element arranged to engage with and hold said digital type-impression mechanism during operation of said adding mechanism, and means for operating said element to position to hold said digital type-impression mechanism to prevent the percussive action of said type-impression mechanism incidentally to the operation of said key, substantially as specified.

22. In an adding machine, the combination with automatically operating type driving hammers, of a lever, and element actuated by said lever to prevent the action of said hammers, a key, means controlled by said key holding said lever and said element in a position to permit the action of said hammers, and automatic means for operating said lever and thereby said element to prevent the action of said hammers incidentally to the operation of said key, substantially as specified.

23. In an adding machine, the combination with type driving hammers arranged for percussive action, and latches holding said hammers, of an element separate from said latches adjustable automatically in certain operations of the machine to prevent the percussive action of said hammers, and independent means for preventing the percussive action of varied numbers of said hammers in other operations of the machine, substantially as specified.

24. In an adding machine, the combination with mechanism operable to perform mathematical calculations, percussive printing mechanism operable to print said mathematical calculations and elements latching parts of said printing mechanism, of means separate from said elements operated automatically in certain operations of said calculating mechanism to prevent the percussive action of said printing mechanism, and manually operable means to prevent percussive action of selected parts of said printing mechanism, substantially as specified.

25. In an adding machine, the combination with mechanism operable to perform mathematical calculations, type-driving hammers operable automatically in certain operations of the machine, elements holding said hammers in idle position, and means for releasing varied numbers of said hammers for automatic operation as aforesaid, of a device adjustable to engage and prevent operation of all of said hammers when all of said hammers are released, and a device adjustable to engage and prevent operation of any of said hammers less than the entire number thereof, substantially as described.

26. In an adding machine, the combination of automatically operating type-driving hammers, movable type-carriers, two arms supported adjacent to said hammers, a rod supported by said arms, a spring for actuating said arms to move said rod into the path of movement of said hammers, means for placing said spring under tension effectively to actuate said arms and said rod as aforesaid, and a spring arranged to overcome the power of said first-named spring to actuate said arms to move said rod out of the path of movement of said hammers, substantially as described.

27. In an adding machine, the combination with a series of hammers operable automatically in recording operations, of a rod movable into and out of the path of said hammers, a spring arranged to actuate said rod into the path of movement of said hammers, a lever for tensioning said spring to cause said spring to move said rod into the path of movement of said hammers, means for actuating said lever, and a spring in connection with said lever arranged to overcome the power of said first-named spring to restore said lever to its idle position and actuate said rod out of the path of movement of said hammers, substantially as described.

28. In an adding machine, the combination with a series of type-carriers, an element holding said type-carriers, and means for moving said element in one direction to release any desired number of said type-carriers successively, of manipulative means for moving said element in another direction in whatever position said element may have been moved by said first-named means to release an additional number of said type-carriers, substantially as described.

29. In an adding machine, the combination with adding mechanism, type-carriers for actuating said adding mechanism in adding and clearing operations, an element holding said type-carriers, and means for moving said element in one direction to release any desired number of said type-carriers for adding operations, of means for moving said element in another direction while said element is in the position to which it was moved as aforesaid to release an additional number of said type-carriers for adding operations, and means for restoring said element to the position from which it was moved by said last-named means, substantially as described.

30. In an adding machine, the combination with a series of type-carriers, an element holding said type-carriers, means for moving said element in one direction to release any desired number of said type-carriers, and a series of hammers arranged to drive type on said type-carriers to record, of a device for moving said element in another direction to release an additional number of said type-carriers, manipulative connections for actuating said device, and a spring for restoring said device and said element to position to prevent operation of said type-carriers, substantially as described.

31. In an adding machine, the combination with a series of type-carriers operable in adding operations, a movable carriage, an element in said carriage preventing operation of said type-carriers, and means for moving said carriage and said element in one direction to release any desired number of said type-carriers for adding operations, of a manually operable device for moving said element in another direction to any position in said carriage to release all of said type-carriers for adding operations, substantially as described.

32. In an adding machine, the combination of a series of type-carriers, a movable carriage controlling the operation of said type-carriers, an element in said carriage for preventing operation of said type-carriers, means for moving said carriage and said element in one direction to release any desired number of said type-carriers successively for adding operations, a plate slidably supported in said carriage, means controlled by said plate for raising and lowering said element, a spring holding said plate normally in position to hold said element in position to prevent operation of said type-carriers, and manipulative connections for actuating said plate to move said element downwardly to enable all of said type-carriers to operate in adding operations, substantially as described.

33. In an adding machine, the combination with type driving hammers, means holding said hammers, means for releasing said hammers, and means for operating said hammers to print, of an element for preventing printing action of said hammers, a spring holding said element in position to permit printing action of said hammers, a key controlling said spring, and separate means for actuating said element to position to prevent printing action of said hammers, substantially as specified.

34. In an adding machine, the combination with spring actuated type driving hammers, latches holding said hammers, and means for releasing said hammers, of a device for preventing operation of said hammers after they have been released, a lever holding said device in position to permit operation of said hammers, means for actuating said lever, and automatic means for moving said device to position to prevent operation of said hammers, substantially as specified.

In testimony whereof, I hereunto affix my signature to this specification this 6th day of July, 1909, in the presence of two witnesses.

JOHN MAGNUS.

Witnesses:
 CHARLES PICKLES,
 SEELY C. BUNN.